United States Patent [19]

Hirschberger

[11] Patent Number: 5,055,022
[45] Date of Patent: Oct. 8, 1991

[54] MULTIPLE PARISON EXTRUSION DEVICE FOR PRODUCING LAMINAR ARTICLES

[75] Inventor: Michael Hirschberger, Sylvania, Ohio

[73] Assignee: Hoover Universal, Inc., Plymouth, Mich.

[21] Appl. No.: 497,513

[22] Filed: Mar. 22, 1990

[51] Int. Cl.⁵ .............................................. B29C 49/04
[52] U.S. Cl. .................................. 425/131.1; 264/349; 366/77; 425/208; 425/382.4; 425/522
[58] Field of Search .................. 264/349, 75, 176.1; 425/206, 208, 382.4, 130, 131.1, 207, 522; 366/77, 79, 80, 90, 318, 324

[56] References Cited

U.S. PATENT DOCUMENTS

| | | | |
|---|---|---|---|
| 1,935,050 | 11/1933 | Gordon | 366/80 |
| 2,171,095 | 8/1939 | Orsini | 264/75 |
| 2,514,841 | 7/1950 | Chase | 264/349 |
| 2,633,602 | 4/1953 | Sverdrup | 366/77 |
| 2,810,159 | 10/1957 | Teichmann | 425/207 |
| 3,409,711 | 11/1968 | Pashak et al. | 264/349 |
| 3,942,774 | 3/1976 | Sokolow | 366/77 |
| 4,133,460 | 1/1979 | Jerpbak | 366/79 |
| 4,300,840 | 11/1981 | Kishihiro | 425/208 |
| 4,429,551 | 2/1984 | Hizume | 425/380 |
| 4,945,807 | 8/1990 | Loomas et al. | 366/77 |

Primary Examiner—Jay H. Woo
Assistant Examiner—William J. Matney, Jr.
Attorney, Agent, or Firm—Harness, Dickey & Pierce

[57] ABSTRACT

An extrusion device for producing an article of a heterogeneous blend of incompatible polymers, one polymer forming a matrix and the other being in a discontinuous phase within the matrix. The device is used with either side-fed or center-fed multiple parison die heads. The desired heterogeneous resin structure is formed and maintained by a unique extrusion screw and adapter configuration that avoids division of the melt stream to feed the multiple parison die head after formation of the desired resin structure. This is accomplished by a plurality of arcuate flow passages in the terminal portion of the extrustion screw directly feeding each die. The arcuate flow passages are formed by ribs that extend radially inwardly from the extruder barrel toward a flightless terminal portion of the screw shaft and tip. Circulatory resin flow in the arcuate flow passages driven by the screw rotation forms the desired laminar resin structure.

4 Claims, 3 Drawing Sheets

MULTIPLE PARISON EXTRUSION DEVICE FOR PRODUCING LAMINAR ARTICLES

BACKGROUND AND SUMMARY OF THE INVENTION

This invention relates to an extrusion device for making thermoplastic articles molded from a heterogeneous blend of incompatible polymers. Especially preferred polymers are a polyolefin first polymer and a second polymer, incompatible with the polyolefin. The invention specifically relates to an extrusion device for a multiple parison die head.

U.S. Pat. No. 4,410,482 discloses the manufacture of thermoplastic articles from a heterogeneous blend of polyolefin first polymer and an incompatible second polymer. The articles produced according to that patent have the polymer present as a multitude of thin, substantially two-dimensional, parallel and overlapping layers in the polyolefin and the articles in the form of containers are disclosed to exhibit permeation barrier characteristics greatly increased in comparison with containers made from the polyolefin alone. Other patents which disclose articles having a similar construction include U.S. Pat. Nos. 4,444,817 and 4,416,942.

The aforementioned patents form the basis of what is known as the Dupont laminer flow technology. In the DuPont process the matrix resin and the barrier resin, such as Dupont's Selar RB, a modified nylon are dry mixed prior to being fed into the extrusion screw. A prerequisite to providing the desired permeability barrier is in controlled mixing of the barrier resin with the matrix resin. Proper mixing will produce many large, essentially two dimensional, barrier walls within the matrix resin. If the mixing is insufficient, the pellets of the barrier resin will not stretch to form the barrier walls, thus resulting in little improvement in the permeability resistance of the finished article over that provided by the matrix resin itself. If the barrier resin is over mixed, the barrier resin will break apart into small particles with little improvement in permeability resistance resulting.

The formation of desirable heterogeneous resin structure has been successfully accomplished with single parison die heads. However, attempts to produce barrier containers with multiple parison die heads, particularly three or more parison die heads, have had little success. In many cases, the resulting containers have no, or only little, improvement in permeability resistance. An investigation by the present inventor regarding flow patterns of a heterogeneous resin blend flowing in an extrusion blow molding machine has provided the following explanation of the difference in barrier performance of containers from single parison die heads compared to multiple parison die heads.

As the pellets of the barrier resin reach their melting temperature, streaks of the barrier resin will be formed. These streaks are formed by shear forces in the resin caused by the rotating screw and are substantially circumferential. As the resin flows from the extrusion screw and through the die head to form a tubular parison, the streaks form barrier walls in the matrix resin which, in the finished container, overlap one another to provide permeability resistance in the container wall. In the case of a single parison center-fed die head, the barrier resin platelets formed in the extrusion screw remain relatively undisturbed as the resin flows into the die head around the core to form a tubular parison. When the parison is blown, the platelets remain to form discontinuous, substantially two-dimensional overlapping thin layer barrier walls within the matrix resin to provide permeability resistance in the container wall. In a single parison side fed die head, although the flow patterns are less desirable in terms of maintaining the optimum resin structure, the deviation from the optimum resin structure is normally not large enough to cause a significant loss in the barrier performance.

When the resin is fed from the extrusion screw to a multiple parison die head, such as a triple parison die head, the division of the heterogeneous but well structured resin melt into three separate conduits in the transfer pipe disrupts the desirable structure of the barrier resin. When the resin is divided, many of the platelets are broken apart such that in the finished container, there are gaps or windows in the container wall having few or no barrier walls. These containers have no or only little barrier improvement over that provided by the matrix resin individually.

It is an object of the present invention to provide a multiple parison blow molding machine for producing containers of a matrix resin having thin layer barrier walls formed therein.

Applicant's co-pending patent application, Ser. No. 418,554, filed Oct. 10, 1989, provides a multiple parison die head which reconstructs a destroyed heterogeneous resin structure after the resin has been divided and fed to separate dies within the multiple parison die head. In contrast, it is a further object of the present invention to avoid the destruction of the heterogeneous resin structure altogether.

The extrusion device of the present invention consists of a uniquely configured screw extruder and adapter for feeding separate resin streams to a multiple parison die head. The screw extruder of this invention, like conventional extruders, includes a screw shaft and flight disposed within a barrel. The extrusion screw immediately upstream from the screw tip, does not contain any flights.

The barrel inner surface surrounding the shaft terminal portion is radially spaced from the shaft and includes ribs that project radially inwardly toward the shaft forming a close clearance with the shaft. These ribs extend longitudinally in the bore and are continued in the adapter along the screw tip. The ribs form a number of arcuate flow passages circumferentially about the shaft. The number of ribs and flow passages is equal to the number of parisons produced by the associated multiple parison die head with the resin from each flow passage being directed to a separate die.

The adapter is coupled to the end of the barrel and directs the resin from the arcuate flow passages into separate feed tubes. The adapter has a generally conical inlet into which the tip of the screw shaft projects. The inlet also has radially inwardly projecting ribs that form a smooth continuation of the ribs in the barrel. The adapter ribs and inlet are inclined inwardly in the direction of downstream resin flow generally parallel to the shaft tip. The inlet and ribs thus form a number of irregularly shaped funnel portions around the screw tip to direct the resin smoothly from the arcuate flow passages into the separate feed tubes.

The resin in the arcuate flow passages will be pushed longitudinally through the flow passages by resin upstream and still in contact with the screw flight. The rotation of the screw shaft will cause the resin to flow circumferentially, i.e., to circulate, within each arcuate flow passage. This circumferential and longitudinal flow of the resin will cause the soft pellets of the barrier resin to elongate and stretch to form platelets within the matrix resin. These platelets form the barrier walls in the finished plastic container. By first dividing the resin in the extruder barrel into separate streams, then stretching the barrier resin to form platelets, the laminar resin structure is formed and conveyed in a manner similar to a single parison die head. The structure is not later destroyed or damaged by dividing the resin stream.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
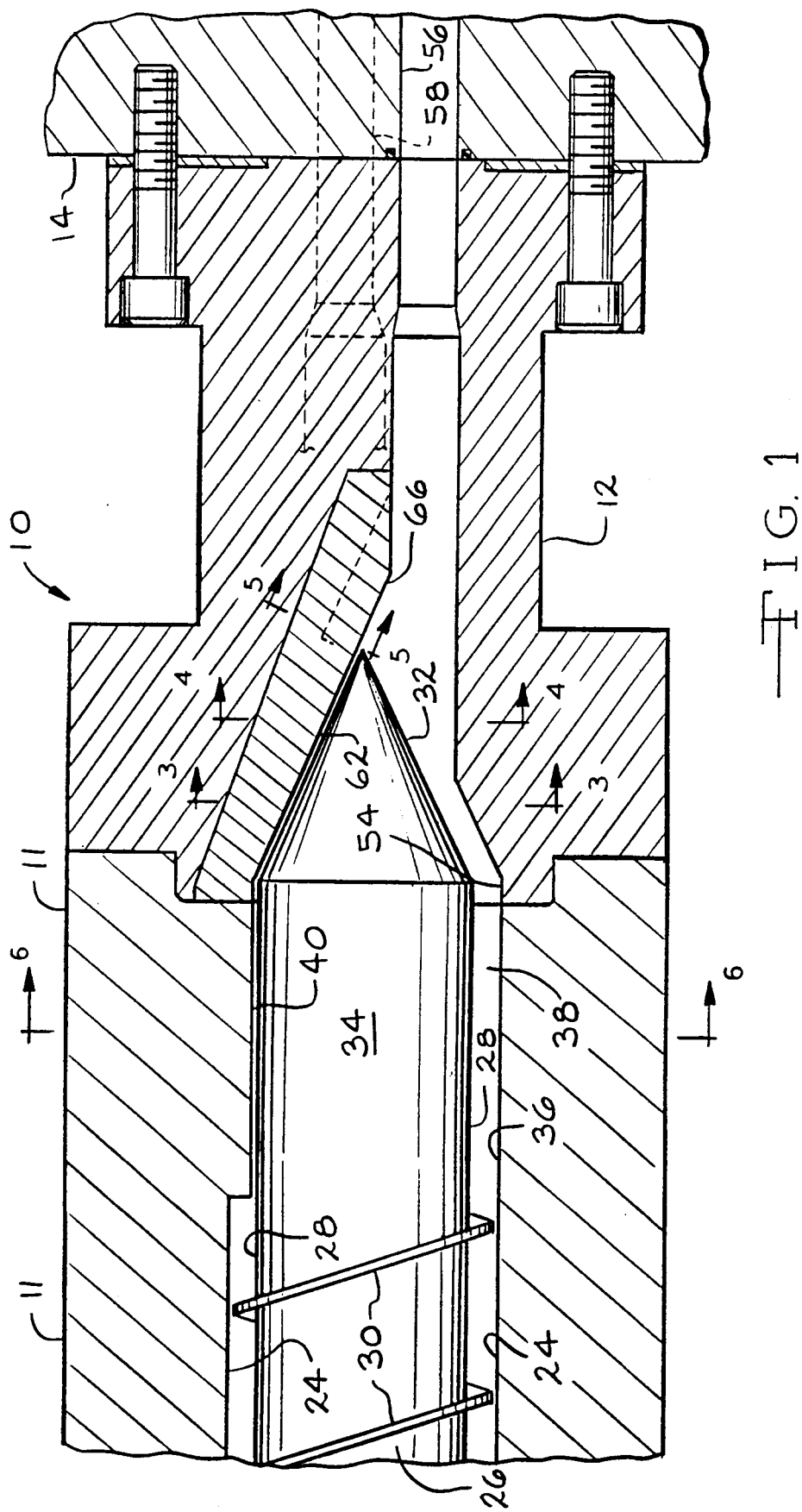
FIG. 1 is a sectional view of the end portion of the screw extruder and adapter of the present invention used to provide molten resin to the die head.
Figure 3:
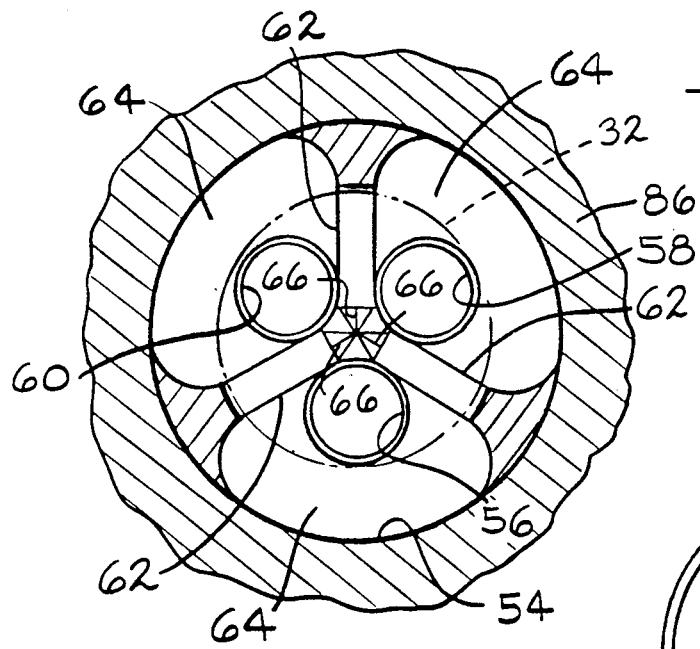
FIGS. 3 and 4 are sectional views of the adapter as seen from substantially the lines 3—3 and 4—4 of FIG. 1 respectively, the screw tip being shown in phantom lines for purposes of clarity.
Figure 2:
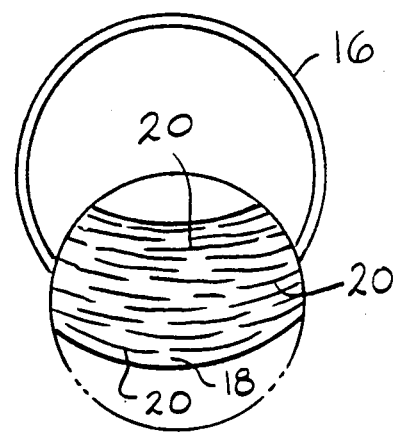
FIG. 2 is an end view of a container wall manufactured by the extrusion device of this invention with a portion broken away and enlarged to show the barrier walls within the matrix resin.
Figure 4:
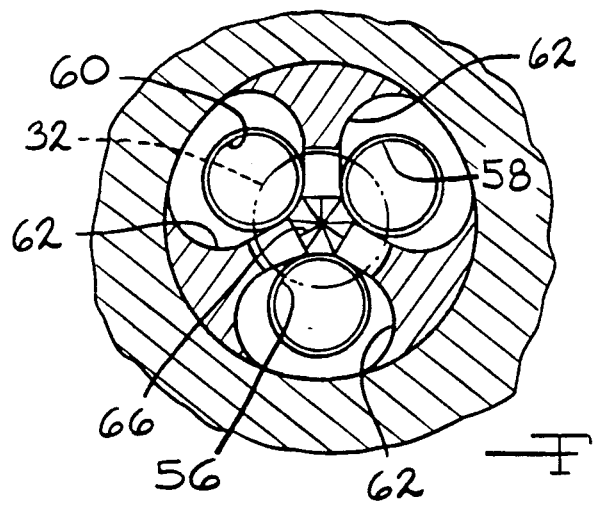
Figure 5:
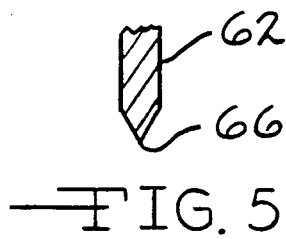
FIG. 5 is a sectional view of the adapter as seen from substantially the line 5—5 of FIG. 1.

The extrusion device of the present invention is shown in FIG. 1 and designated generally at 10. Device 10 includes a barrel and an adapter or manifold 12 through which the resin flows to feed each of the parison forming dies. The parisons are used to blow mold containers 16, an end view of which is shown in FIG. 2. The parison, from which container 16 is molded, consists of a heterogeneous blend of incompatible polymers such as high density polyethylene 18 and a barrier resin such as Dupont's Selar RB that forms a plurality of discontinuous thin layer barrier walls 20 in the HDPE matrix. The barrier walls 20 generally overlap one another in the wall of container 16 to provide a permeability barrier.

As illustrated, the extrusion device 10 is configured for a triple parison die head but the principles of the invention can be used with extruders for die heads producing other numbers of parisons as well.

Barrel 11 has a longitudinally extending bore 24 therethrough. Disposed within the bore 24 is an extrusion screw 26 having a shaft 28 with thread flight 30 extending radially outwardly therefrom. As the screw is rotated, the thread flight 30 moves plastic resin through the bore 24. As it moves, the resin is heated, melted, mixed and compressed. The thread flight 30 terminates upstream from the tip 32 of the screw creating a threadless terminal portion 34 of the shaft 28. The inner surface 36 of the bore is radially spaced from the screw shaft 28.

Figure 6:
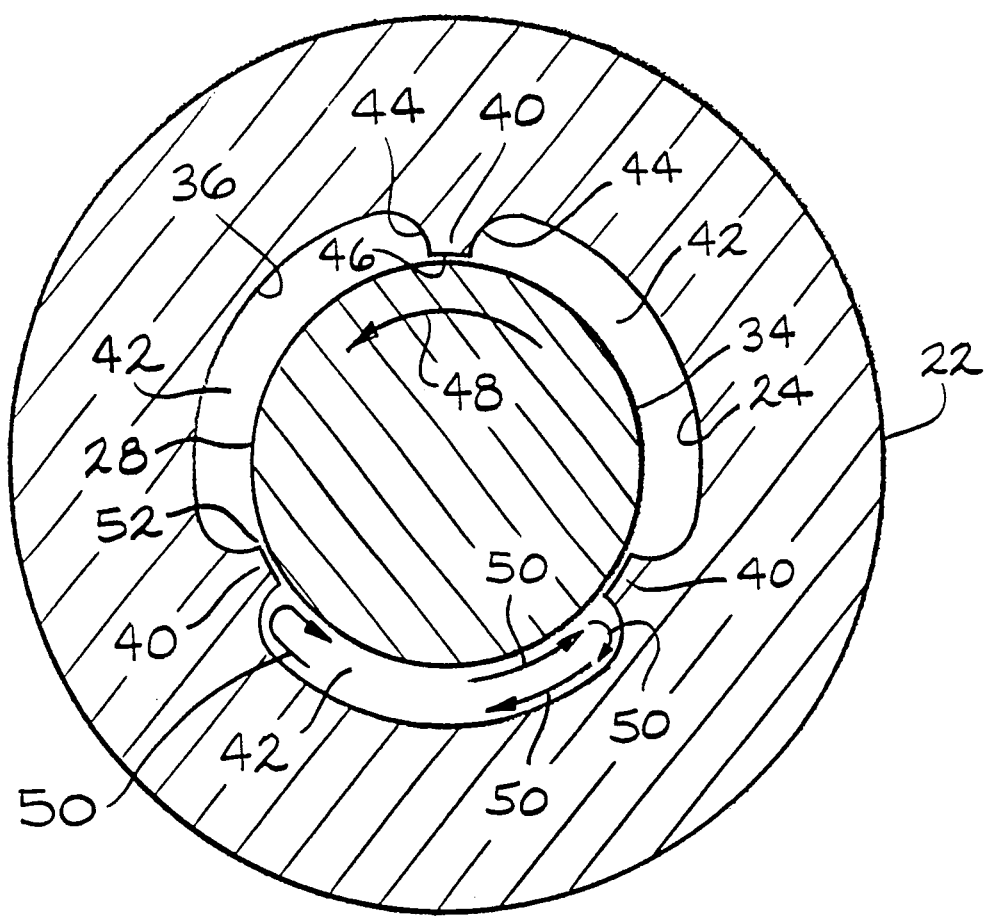
FIG. 6 is a sectional view of the screw extruder as seen from substantially line 6—6 of FIG. 1.

Ribs 40 project radially inwardly from the bore inner surface into the space between the bore and the shaft so as to divide it into three arcuate flow passages 42. The ribs 40 extend longitudinally through the bore adjacent the shaft terminal portion and are formed by longitudinal arcuate wall sections 44 shown in FIG. 6. The wall sections 44 merge smoothly with the inner surface 36 of the bore and converge radially inwardly, terminating in circumferential wall sections 46 that define a small clearance between the ribs and shaft. Wall sections 44 form longitudinally extending edges of the arcuate flow passages 42.

The resin within the flow passages 42 is pushed longitudinally through the flow passages by the upstream resin still in contact with the thread flight. The radially inner portion of the resin in the flow passages 42 is simultaneously forced to flow circumferentially as a result of contact with the shaft 28 rotating in the direction of arrow 48. As the circumferentially flowing resin encounters one of the arcuate wall sections 44 forming ribs 40, the resin is forced by the arcuate wall to flow toward the radially outer edge of the flow channels 42 as shown by the arrows 50 thereby creating a circulating flow within the arcuate flow passages. The shear created by this motion within the flow passages 42 causes the barrier resin pellets to stretch, forming platelets that are confined within the separate flow passages 42. The clearance 52 between the ribs 40 and the screw shaft 28 is required to avoid contact between the shaft and the ribs but is made as small as possible to minimize resin leakage into the adjacent flow passage, thereby maintaining the desired flow pattern.

As will be described below, the resin from the arcuate flow passages will be directed smoothly into separate feed tubes to direct the resin to individual dies to form separate parisons. By confining the resin within separate flow passages at the location in the extruder where the laminar structure is formed, the platelets are also confined within separate flow passages. When the resin later flows into separate feed tubes, it is not necessary to divide the flow stream destroying the barrier structure.

The adapter 12 includes a circular inlet 54 for reception of the conical tip 32 of the screw 26 and for the resin flowing from the barrel 11. The adapter directs the resin into three feed tubes 56, 58, and 60 for feeding resin into a triple parison die head 14. The die head can follow directly downstream of the adapter or a separate manifold can be used to connect the adapter to the die head.

The adapter inlet 54 includes three radially inwardly extending ribs 62 that form longitudinal continuations of the barrel ribs 40. The inlet 54 and the ribs 62 are inclined radially inwardly in a direction downstream to follow the conical tip 32 of the screw shaft 28 defining three irregularly shaped funnel portions 64 inclined radially inwardly toward the feed tubes 56, 58, and 60. The downstream end of the ribs 62 form inwardly directed chisel points 66 that converge at the center of the adapter 12. The diameter of the feed tubes 56, 58 and 60 and the location of a tapered portion 82 in the tubes can be varied to balance the flow of resin in the feed tubes.

As the resin flows through the arcuate flow passages at the end of the screw extruder, the barrier resin forms the platelets which form the barrier walls in the finished container. Since this occurs after the resin flow stream as been divided to feed a multiple parison die head, no later division of the resin stream and resultant destruction of the barrier resin structure occurs.

It is to be understood that the invention is not limited to the exact construction illustrated and described above, but that various changes and modifications may be made without departing from the spirit and scope of the invention as defined in the following claims.

What is claimed is:

1. An extrusion device for supplying plastic resin to a multiple parison die head comprising:

a barrel having a longitudinaly extending bore therethrough;

an extrusion screw longitudinally disposed within said bore, said screw having a flighted upstream portion having a spiral flight radially extending from a screw shaft, a non-flighted downstream portion formed by said shaft and a tip portion at a downstream end, said bore being radially spaced from said non-flighted downstream portion of said shaft forming an annular flow path for resin,; and means within said bore surrounding said non-flighted downstream portion of said shaft for dividing said annular flow path into a plurality of substantially separated flow passages extending longitudinally over said non-flighted downstream portion of said shaft whereby resin is divided into separated resin streams flowing through said separated flow passages.

2. The device of claim 1 wherein said dividing means includes a plurality of longitudinally extending ribs projecting inwardly from said bore toward said non-flighted downstream portion of said shaft forming said plurality of separated flow passages spaced circumferentially about said shaft.

3. The device of claim 2 further comprising an adapter coupled to the downstream end of said barrel having a circular inlet for receiving said screw tip portion therein, said inlet being tapered in the downstream direction to generally follow said screw tip portion, said inlet including a plurality of inwardly projecting ribs forming continuations of said bore ribs, said inlet ribs and said screw tip portion cooperating to divide said inlet into a plurality of substantially separated funnel portions aligned with the separated flow passages within said bore for receiving molten resin from said separated flow passages, said adapter further including a plurality of feed tubes downstream of said funnel portions with one feed tube extending from each of said funnel portions.

4. The device of claim 3 wherein said bore ribs are formed by longitudinally extending arcuate wall sections merging smoothly with said bore and curving radially inwardly toward said shaft forming rib side walls, opposite side walls of each rib converging toward one another in a radially inward direction and terminating at a circumferential wall closely spaced from said non-flighted downstream portion of said shaft whereby an operating clearance between said ribs and said screw is provided while substantially separating said flow passages from one another.

* * * * *